Dec. 2, 1958  K. M. HAZELROTH  2,862,420
REAR VIEW MIRROR
Filed Aug. 8, 1955
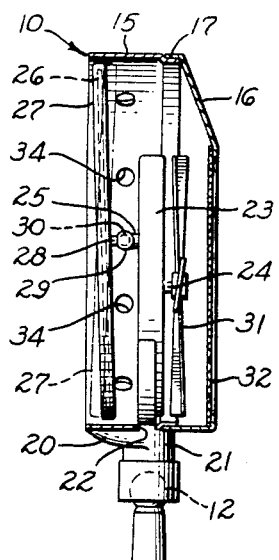
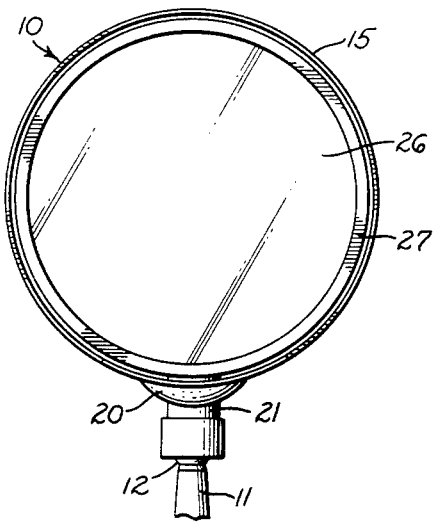
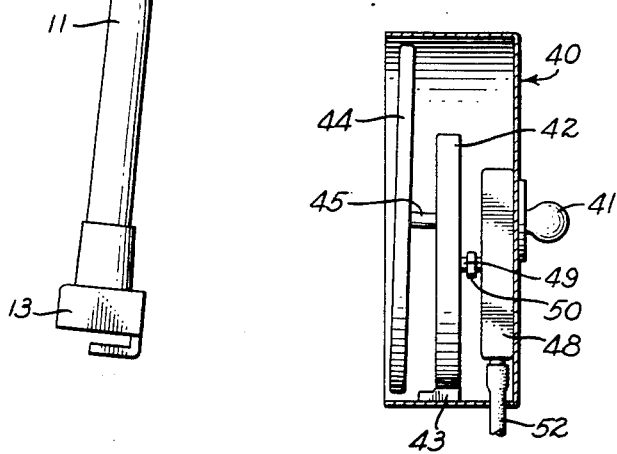
INVENTOR.
KENNETH M. HAZELROTH
BY HIS ATTORNEYS.
HARRIS, KIECH, FOSTER & HARRIS

United States Patent Office 2,862,420
Patented Dec. 2, 1958

2,862,420
REAR VIEW MIRROR
Kenneth M. Hazelroth, Rivera, Calif.
Application August 8, 1955, Serial No. 526,947
4 Claims. (Cl. 88—98)

This invention relates to a mirror having a broad field of view suitable for use as a rear view mirror in an automobile or the like, and, more particularly, to a mirror in which the field of view is scanned.

In order to obtain a wide field of view in conventional rear view mirrors, it has been the practice to increase the size of the reflecting surface resulting in an increased blocking of the operator's forward field of view, or to use curved reflecting surfaces, which, while providing a wider field of view, also introduce distortion in the images.

It is an object of this invention to provide a mirror suitable for use as a rear view mirror having a broad field of view, yet introducing no distortion into the image and occupying a small area. A further object of the invention is to provide a mirror of this type in which the broad field of view is covered by a scanning by the reflecting surface.

Another object of the invention is to provide a rear view mirror which is rotated about an axis, with the reflecting surface of the mirror slightly offset from a plane perpendicular to the axis of rotation. A further object of the invention is to provide such a mirror which may be driven in rotation by the motion of the vehicle to which it is attached as by a fan exposed to the slipstream, or by a speedometer-type cable.

The invention also comprises novel details of construction and novel combinations and arrangements of parts which will more fully appear in the course of the following description. The drawings merely show and the description merely describes preferred embodiments of the present invention as applied to a rear view mirror which are given by way of illustration or example.

In the drawings:
Fig. 1 is a side view, shown partially in section, of a preferred embodiment of the invention;
Fig. 2 is a partial view rear view of the embodiment of Fig. 1; and
Fig. 3 is a view similar to that of Fig. 1 showing an alternative embodiment of the invention.

In the embodiment of Fig. 1, a housing 10 is mounted on a support bracket 11, the housing pivoting on a ball end 12 of the support bracket 11. A clamp 13, which may be the conventional type, is fixed to the other end of the support bracket 11 for mounting the assembly to an automobile door or the like.

In the housing 10, a cylindrical shell 15 and a tapered shell section 16 are joined by suitable means such as soldering at a lap joint 17 to provide an enclosure, the shell 15 resting in an outstanding arm 20 of a cradle 21. The cradle 21 extends through an opening 22 in the shell 15, a gear reduction unit 23 having a high speed shaft 24 and a low speed shaft 25 being mounted in that portion of the cradle extending within the shell 15.

A mirror 26 is set in a mirror frame 27, a shaft 28 being mounted on and projecting from the frame. The mirror and frame are coupled to the gear reduction unit 23 through their respective shafts 28, 25 and a shaft coupling 29. The mirror is mounted so that the plane of its reflecting surface intersects a plane perpendicular to the axis of the shaft 28 rather than being parallel therewith and as the driving shaft 25 rotates the reflecting surface of the mirror 26 wobbles about the axis of the shaft 25. When the mirror is rotated about the axis of the shaft, the view reflected to an observer will vary as a function of the rotation angle, thereby considerably increasing the field of view of the observer.

The mirror frame shaft 28 may have a ball-shaped end 30 mating with a socket in the coupling 29, the ball and socket being normally rigid but capable of adjustment to enable the vehicle operator to change the angle between the reflecting surface and axis of rotation.

A fan 31 is mounted on the high speed shaft 24 of the gear reduction unit to provide a rotating drive for the mirror. In using the embodiment shown in Fig. 1, the unit is installed with the fan 31 placed in the slipstream of a vehicle, the fan end of the unit being generally toward the direction of travel. In the housing 10, a screen 32 covers the forward end of the shell 16 to prevent large objects from striking the fan, the housing 16 being tapered to increase the efficiency of the fan operation. A plurality of apertures 34 may be provided in the shell 15 for the flow of air out of the housing. Alternatively, the outside diameter of the mirror frame and the inside diameter of the shell 15 may be chosen so that the air may flow outward between these two components. The power delivered by the fan may be increased by modifying the internal contours of the housing 10, such as shaping the housing in the form of a venturi tube.

In one unit embodying the features of the invention shown in Figs. 1 and 2, satisfactory performance when mounted on an automobile was obtained by having the plane of the reflecting surface of the mirror intersect a plane perpendicular to the axis of rotation of the mirror by an angle of approximately 4°, and by adjusting the fan and gear reduction unit so that, at a speed of 35 miles per hour, the mirror rotated at approximately 15 revolutions per minute, the reflecting surface of the mirror being approximately 2 inches in diameter.

It is possible to use means other than a fan to drive the mirror, and, of course, selection of a gear reduction unit is dictated by the speed of the driving means. In Fig. 3, an alternative embodiment of the invention having a driving means external to the mirror unit is illustrated. Therein, a cup-shaped housing 40 is provided with a ball pivot 41 adapted to be mounted in a suitable bracket, not shown. A gear reduction unit 42 similar to the gear reduction unit 23 of Fig. 1 is mounted within the housing 40 on a bracket 43, a mirror frame 44 being directly assembled to a low speed shaft 45 of the gear reduction unit 42. The plane of the reflecting surface of the mirror in the frame 44 is offset from the axis of rotation of the frame in the same manner as described with respect to Fig. 1. A right angle drive unit 48 is mounted on the back wall of the housing 40, the output of the drive unit being coupled to the high speed shaft 49 of the gear reduction unit 42 by a coupling 50. A flexible shaft 52 is coupled to the input of the right angle drive shaft 48, the flexible shaft 52 providing the driving power for the rotating mirror in the same manner as did the fan 31 of Fig. 1.

The flexible shaft 52 may be actuated by the motion of the vehicle to which the unit is mounted, if desired. One suitable method would be to couple the shaft 52 to the drive shaft of the vehicle in the same manner that the speedometer cable is connected. Alternatively, the flexible shaft 52 may be driven at an approximately constant speed by connecting it to a small electric motor, or the like, positioned within the vehicle. Further, the shaft 52 may be driven by a vacuum driven motor deriving its power from the intake manifold of a conventional internal combustion engine.

Although several exemplary embodiments of the invention have been disclosed and discussed, it will be understood that other applications of the invention are possible, and that the embodiments disclosed may be subjected to various changes, modifications and substitutions without necessarily departing from the spirit of the invention.

I claim as my invention:

1. In a movable rear view mirror for the operator of a vehicle, the combination of: a housing mounting a speed reduction means, said speed reduction means having an output drive means perpendicular to a first plane and an input drive means, said first plane being approximately perpendicular to the longitudinal axis of the vehicle; a mirror having a reflecting surface, said surface occupying at least in part a second plane; means connecting said output drive means to said mirror in driving relationship, said connecting means displacing said mirror so that said second plane is not parallel to said first plane; and a fan mounted in said housing and connected to said input drive means for movement of said mirror, said fan being exposed toward the forward end of the vehicle for rotation by fluid flow past the vehicle, whereby said second plane of said reflecting surface will wobble about the rotation axis and relative to said first plane.

2. In a movable rear view mirror for the operator of a vehicle, the combination of: a housing mounting a speed reduction means, said speed reduction means having an output drive means perpendicular to a first plane and an input drive means, said first plane being approximately perpendicular to the longitudinal axis of the vehicle; a mirror having a reflecting surface, said surface occupying at least in part a second plane; means connecting said mirror to said output drive means, said connecting means comprising a pivotal adjustable connection whereby said mirror may be displaced so that said second plane is disposed not parallel to said first plane; and a fan mounted in said housing and connected to said input drive means for movement of said mirror, said fan being exposed toward the forward end of the vehicle for rotation by fluid flow past the vehicle, whereby said second plane of said reflecting surface will wobble about the rotation axis and relative to said first plane.

3. In a rear view mirror for a vehicle, the combination of: a housing having a longitudinal axis and adapted to be mounted on a vehicle with said longitudinal axis of said housing approximately parallel to the longitudinal axis of the vehicle; a mirror rotatably mounted in said housing with the axis of rotation thereof substantially parallel to said longitudinal axis of said housing, the plane of the reflecting surface of said mirror intersecting a plane perpendicular to said axis of rotation of said mirror; a fan rotatably mounted relative to said housing with the axis of rotation of said fan substantially parallel to said longitudinal axis of said housing; and means for coupling said fan to said mirror in driving relationship, said fan being actuated by the motion of the vehicle for continuous rotation of said mirror while the vehicle is moving.

4. In a rear view mirror for a vehicle, the combination of: a support bracket adapted to be mounted on a vehicle; a housing having a longitudinal axis and pivotally mounted on said support bracket with said longitudinal axis of said housing approximately parallel to the longitudinal axis of the vehicle; a mirror rotatably mounted in said housing with the axis of rotation thereof substantially parallel to said longitudinal axis of said housing, the plane of the reflecting surface of said mirror intersecting a plane perpendicular to the axis of rotation of said mirror; a fan positioned within said housing, said housing having an opening in the forward wall permitting fluid flow into said housing past said fan; and speed-reducing means coupling said fan to said mirror for continuous rotation of said mirror while the vehicle is moving producing fluid flow past said fan.

References Cited in the file of this patent

UNITED STATES PATENTS

| | | |
|---|---|---|
| 1,293,479 | Laws | Feb. 4, 1919 |
| 1,952,804 | Hitshew | Mar. 27, 1934 |
| 2,456,362 | Aves | Dec. 14, 1948 |
| 2,570,536 | Fellabaum | Oct. 9, 1951 |
| 2,724,995 | Matner | Nov. 29, 1955 |
| 2,737,852 | Porter et al. | Mar. 13, 1956 |